US011861896B1

(12) United States Patent
Wang et al.

(10) Patent No.: US 11,861,896 B1
(45) Date of Patent: Jan. 2, 2024

(54) AUTONOMOUS AERIAL NAVIGATION IN LOW-LIGHT AND NO-LIGHT CONDITIONS

(71) Applicant: Skydio, Inc., Redwood City, CA (US)

(72) Inventors: Samuel Shenghung Wang, Mountain View, CA (US); Vladimir Nekrasov, Adelaide (AU); Ryan David Kennedy, Redwood City, CA (US); Gareth Benoit Cross, Mountain View, CA (US); Peter Benjamin Henry, San Francisco, CA (US); Kristen Marie Holtz, Menlo Park, CA (US); Hayk Martirosyan, San Francisco, CA (US); Abraham Galton Bachrach, Redwood City, CA (US); Adam Parker Bry, Redwood City, CA (US)

(73) Assignee: Skydio, Inc., San Mateo, CA (US)

( * ) Notice: Subject to any disclaimer, the term of this patent is extended or adjusted under 35 U.S.C. 154(b) by 0 days.

(21) Appl. No.: 17/707,841

(22) Filed: Mar. 29, 2022

Related U.S. Application Data

(60) Provisional application No. 63/168,827, filed on Mar. 31, 2021.

(51) Int. Cl.
*G06V 20/17* (2022.01)
*G06V 10/82* (2022.01)
(Continued)

(52) U.S. Cl.
CPC ............ *G06V 20/17* (2022.01); *B64C 39/024* (2013.01); *G05D 1/101* (2013.01); *G06T 3/4038* (2013.01); *G06T 5/008* (2013.01); *G06V 10/30* (2022.01); *G06V 10/60* (2022.01); *G06V 10/82* (2022.01); *H04N 5/33* (2013.01); *B64U 2101/30* (2023.01); *B64U 2201/10* (2023.01); *G06T 2207/10024* (2013.01); *G06T 2207/10032* (2013.01); *G06T 2207/20024* (2013.01); *G06T 2207/20081* (2013.01); *G06T 2207/20084* (2013.01); *G06T 2207/20182* (2013.01); *G06T 2207/30252* (2013.01)

(58) Field of Classification Search
None
See application file for complete search history.

(56) References Cited

U.S. PATENT DOCUMENTS 10,538,326 B1   1/2020  Cui et al.
2015/0035974 A1* 2/2015  Lavi ................. G03B 13/20
                                              348/142

(Continued)

OTHER PUBLICATIONS

Wang W, Chen X, Yang C, Li X, Hu X, Yue T. Enhancing low light videos by exploring high sensitivity camera noise. InProceedings of the IEEE/CVF International Conference on Computer Vision 2019 (pp. 4111-4119). (Year: 2019).*

(Continued)

*Primary Examiner* — Clifford Hilaire
(74) *Attorney, Agent, or Firm* — Young Basile Hanlon & MacFarlane, P.C.

(57) ABSTRACT

Autonomous aerial navigation in low-light and no-light conditions includes using night mode obstacle avoidance intelligence, training, and mechanisms for vision-based unmanned aerial vehicle (UAV) navigation to enable autonomous flight operations of a UAV in low-light and no-light environments using infrared data.

20 Claims, 14 Drawing Sheets

(51) Int. Cl.
  *G06V 10/30*   (2022.01)
  *H04N 5/33*    (2023.01)
  *G06T 5/00*    (2006.01)
  *G06T 3/40*    (2006.01)
  *G05D 1/10*    (2006.01)
  *B64C 39/02*   (2023.01)
  *G06V 10/60*   (2022.01)
  *B64U 101/30*  (2023.01)

(56) References Cited

U.S. PATENT DOCUMENTS

| | | | |
|---|---|---|---|
| 2019/0340738 A1* | 11/2019 | Hartbauer | G06T 5/002 |
| 2020/0007825 A1 | 1/2020 | Jeong et al. | |
| 2020/0209893 A1 | 7/2020 | Lee et al. | |
| 2020/0219010 A1* | 7/2020 | Jobling | G06F 16/285 |
| 2020/0284883 A1 | 9/2020 | Ferreira et al. | |
| 2021/0334580 A1* | 10/2021 | Crescitelli | G06F 18/214 |

OTHER PUBLICATIONS

International Search Report and Written Opinion dated Jul. 19, 2022 in corresponding PCT Application No. PCT/US22/21458.

\* cited by examiner

US 11,861,896 B1

AUTONOMOUS AERIAL NAVIGATION IN LOW-LIGHT AND NO-LIGHT CONDITIONS

CROSS-REFERENCE TO RELATED APPLICATION(S)

This disclosure claims the benefit of U.S. Provisional Application Ser. No. 63/168,827, filed Mar. 31, 2021, the disclosure of which is herein incorporated by reference in its entirety.

TECHNICAL FIELD

This disclosure relates to autonomous aerial navigation in low-light and no-light conditions.

BACKGROUND

Unmanned aerial vehicles (UAVs) are often used to capture images from vantage points that would otherwise be difficult for humans to reach. Typically, a UAV is operated by a human using a controller to remotely control the movements and image capture functions of the UAV. In some cases, a UAV may have automated flight and autonomous control features. For example, automated flight features may rely upon various sensor input to guide the movements of the UAV.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
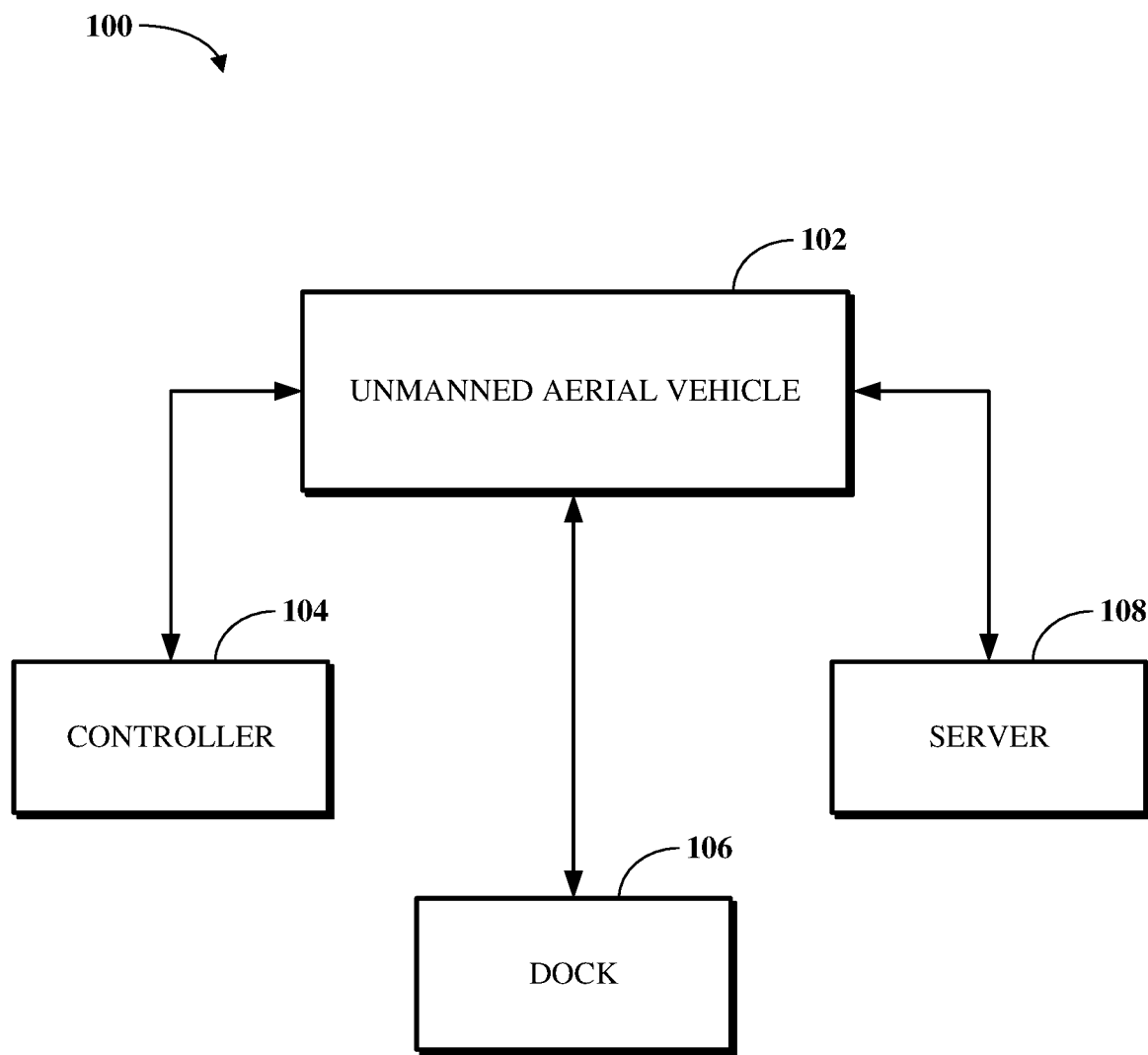
FIG. 1 is an illustration of an example of a UAV system.

Autonomous navigation functions of a UAV conventionally rely upon various onboard sensors, which generate data based on the UAV and/or the environment in which the UAV is operating. The data is generally processed at the UAV to determine one or more aspects of functionality for the UAV, including, for example, how and where the UAV will be flown, whether to capture images and what to focus those images on, whether to follow a subject or a defined flight path, or the like. This processing typically accounts for various environmental and UAV constraints, such as locations of obstacles (e.g., objects) within the environment in which the UAV is operating, indications of whether those obstacles are stationary or mobile, speed capabilities of the UAV, and other external factors which operate against the UAV in-flight.

One common source of sensor data used for UAV navigation are cameras onboard the UAV. For example, one or more cameras coupled to the UAV may continuously or otherwise periodically collect data used to generate images that, when processed by a vision-based navigation system of the UAV, instruct the autonomous navigation functions of the UAV. Conventionally, onboard cameras used for vision-based navigation have infrared filters to prevent infrared data from being collected or to otherwise limit the amount of infrared data that is collected. That is, infrared data may negatively affect the quality of images and therefore may interfere with image processing for autonomous navigation functionality. Accordingly, the filtering of infrared data from images may enhance such functionality and also result in higher quality images output to a connected device display for consumption by an operator of the UAV.

However, such conventional vision-based navigation approaches which rely upon infrared filtering are not optimized for all flight situations and may thus in some cases inhibit autonomous navigation functionality of a UAV. One example of such a situation is where a UAV is being flown in an environment with low or no light, such as outside at nighttime or inside a room that is not illuminated. In such a situation, the UAV must rely upon lights onboard the UAV or lights external to the UAV. In some cases, an inability to accurately perceive the environment in which the UAV is located may force the operator of the UAV to disable obstacle avoidance for autonomous vision-based navigation and manually navigate the UAV. In other cases, it may result in a complete inability of the UAV to autonomously navigate the environment (e.g., flight, takeoff, and/or landing) or damage to the UAV, damage to other property in the environment, and/or injury to anyone nearby the UAV.

Implementations of this disclosure address problems such as these using autonomous aerial navigation in low-light and no-light conditions. A UAV as disclosed herein is configured for vision-based navigation while in day mode or night mode and includes one or more onboard cameras which collect image data including infrared data. A learning model usable for depth estimation in an infrared domain as disclosed herein is trained using images simulated to include infrared data. When the UAV is determined to be in night mode, the UAV uses the learning model to perform obstacle avoidance for autonomous vision-based navigation. When the UAV is determined to be in day mode, images produced based on image data including infrared data are used for autonomous vision-based navigation. In some cases, the images used for navigation while the UAV is in day mode may be filtered to remove infrared data therefrom, for example, using a software process or a physical mechanism.

In some implementations, the UAV includes one or more blocking mechanisms for preventing or limiting glare otherwise resulting from the exposure of an onboard camera to light (e.g., infrared light) illuminated by a light source onboard the UAV.

As used herein, night mode refers to an arrangement of configurations, settings, functions, and/or other aspects of a UAV based on low-light or no-light conditions of an environment in which the UAV is operating. Similarly, and also as used herein, day mode refers to an arrangement of configurations, settings, functions, and/or other aspects of a UAV based on light conditions of an environment in which the UAV is operating sufficient for typical vision-based navigation functionality. Whether a UAV is in night mode or day mode, and when to switch therebetween, is thus based on an amount of light within the environment of the UAV. For example, a UAV may be in night mode when there is insufficient light for navigation using the onboard cameras, and the UAV may otherwise be in day mode. However, in view of potential differences in operating capabilities of UAVs, manufacturing qualities of UAV components, and variations in amounts of light which may be present both in different locations and at different times, the quality of a condition being a low-light condition or a no-light condition may refer to conditions specific to a subject UAV rather than generic conditions that could potentially otherwise apply to multiple types or classes of UAV.

To describe some implementations in greater detail, reference is first made to examples of hardware and software structures used to implement autonomous aerial navigation in low-light and no-light conditions. FIG. 1 is an illustration of an example of a UAV system 100. The system 100 includes a UAV 102, a controller 104, a dock 106, and a server 108.

The UAV 102 is a vehicle which may be controlled autonomously by one or more onboard processing aspects or remotely controlled by an operator, for example, using the controller 104. The UAV 102 may be implemented as one of a number of types of unmanned vehicle configured for aerial operation. For example, the UAV 102 may be a vehicle commonly referred to as a drone, but may otherwise be an aircraft configured for flight within a human operator present therein. In particular, the UAV 102 may be a multi-rotor vehicle. For example, the UAV 102 may be lifted and propelled by four fixed-pitch rotors in which positional adjustments in-flight may be achieved by varying the angular velocity of each of those rotors.

The controller 104 is a device configured to control at least some operations associated with the UAV 102. The controller 104 may communicate with the UAV 102 via a wireless communications link (e.g., via a Wi-Fi network, a Bluetooth link, a ZigBee link, or another network or link) to receive video or images and/or to issue commands (e.g., take off, land, follow, manual controls, and/or commands related to conducting an autonomous or semi-autonomous navigation of the UAV 102). The controller 104 may be or include a specialized device. Alternatively, the controller 104 may be or includes a mobile device, for example, a smartphone, tablet, laptop, or other device capable of running software configured to communicate with and at least partially control the UAV 102.

The dock 106 is a structure which may be used for takeoff and/or landing operations of the UAV 102. In particular, the dock 106 may include one or more fiducials usable by the UAV 102 for autonomous takeoff and landing operations. For example, the fiducials may generally include markings which may be detected using one or more sensors of the UAV 102 to guide the UAV 102 from or to a specific position on or in the dock 106. In some implementations, the dock 106 may further include components for controlling and/or otherwise providing the UAV 102 with flight patterns or flight pattern information and/or components for charging a battery of the UAV 102 while the UAV 102 is on or in the dock 106.

The server 108 is a remote computing device from which information usable for operation of the UAV 102 may be received and/or to which information obtained at the UAV 102 may be transmitted. For example, signals including information usable for updating aspects of the UAV 102 may be received from the server 108. The server 108 may communicate with the UAV 102 over a network, for example, the Internet, a local area network, a wide area network, or another public or private network. Although not illustrated for simplicity, the server 108 may, alternatively or additionally, communicate with the dock 106 over the same or a different network, for example, the Internet, a local area network, a wide area network, or another public or private network. For example, the communication may include flight patterns or other flight pattern information.

In some implementations, the system 100 may include one or more additional components not shown in FIG. 1. In some implementations, one or more components shown in FIG. 1 may be omitted from the system 100, for example, the server 108.

Figure 2A:
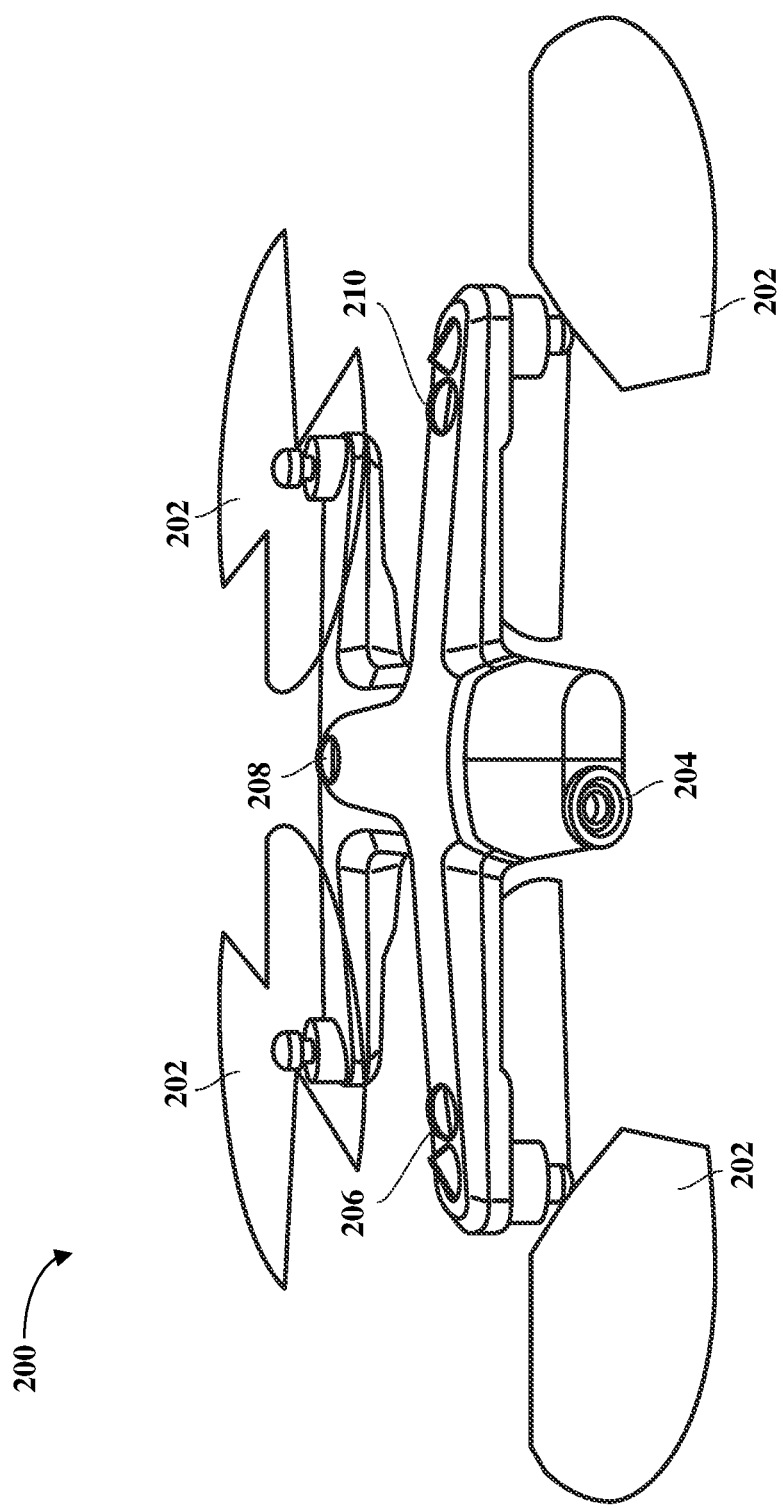
FIG. 2A is an illustration of an example of a UAV as seen from above.
Figure 2B:
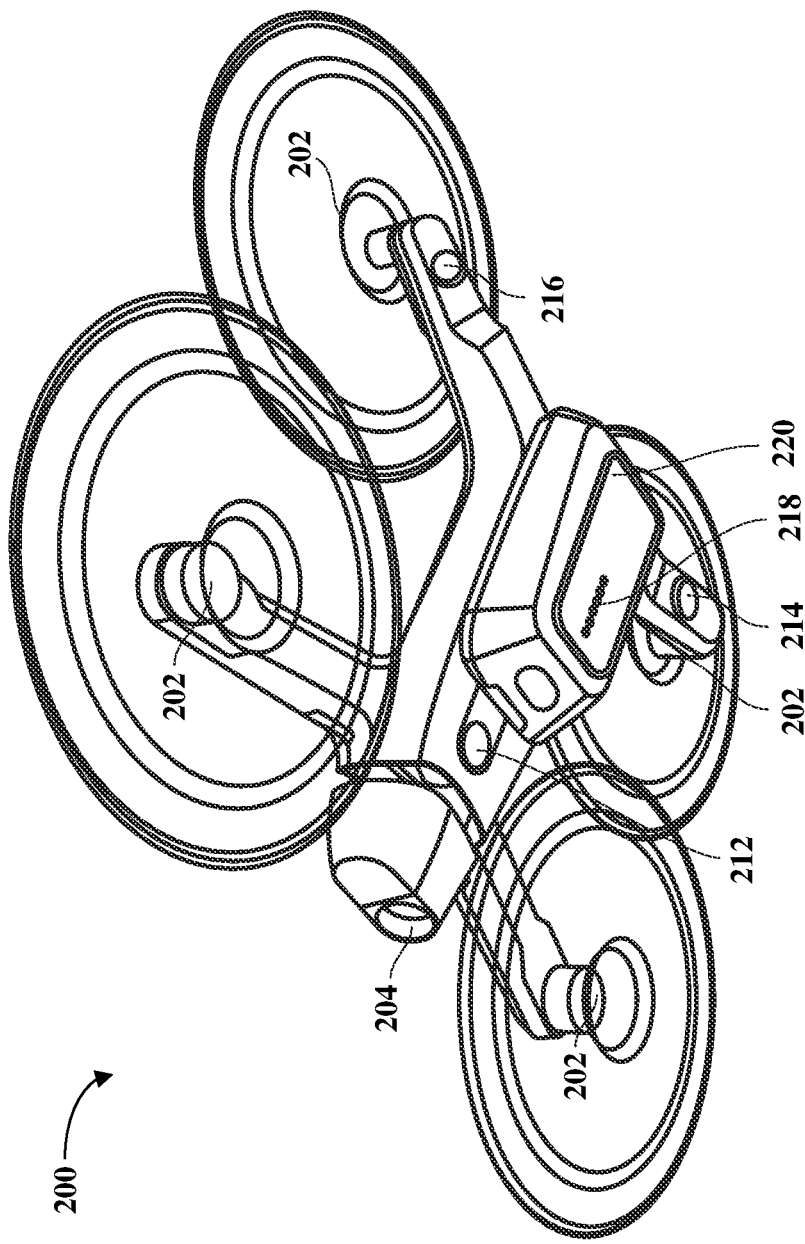
FIG. 2B is an illustration of an example of a UAV as seen from below.
Figure 2C:
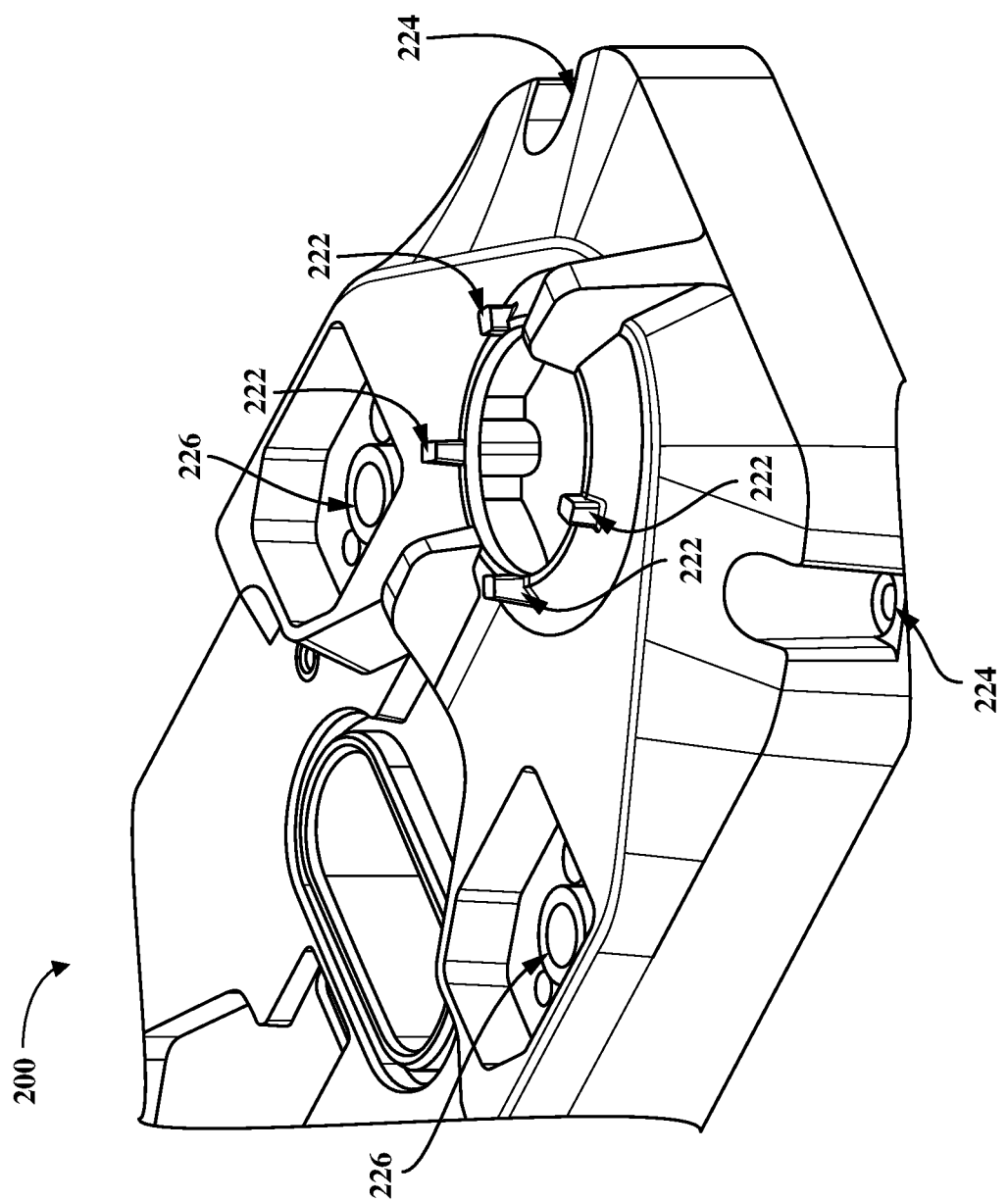
FIG. 2C is an illustration of an example of a portion of a UAV including such a light blocking mechanism.

An example illustration of a UAV 200, which may, for example, be the UAV 102 shown in FIG. 1, is shown in FIGS. 2A-C. FIG. 2A is an illustration of an example of the UAV 200 as seen from above. The UAV 200 includes a propulsion mechanism 202 including some number of propellers (e.g., four) and motors configured to spin the propellers. For example, the UAV 200 may be a quad-copter drone. The UAV 200 includes image sensors, including a high-resolution image sensor 204. This image sensor 204 may, for example, be mounted on a gimbal to support steady, low-blur image capture and object tracking. The UAV 200 also includes image sensors 206, 208, and 210 that are spaced out around the top of the UAV 200 and covered by respective fisheye lenses to provide a wide field of view and support stereoscopic computer vision. The image sensors 206, 208, and 210 generally have a resolution which is lower than a resolution of the image sensor 204. The UAV 200 also includes other internal hardware, for example, a processing apparatus (not shown). In some implementations, the processing apparatus is configured to automatically fold the propellers when entering a dock (e.g., the dock 106 shown FIG. 1), which may allow the dock to have a smaller footprint than the area swept out by the propellers of the propulsion mechanism 202.

FIG. 2B is an illustration of an example of the UAV 200 as seen from below. From this perspective, three more image sensors 212, 214, and 216 arranged on the bottom of the UAV 200 may be seen. These image sensors 212, 214, and 216 may also be covered by respective fisheye lenses to provide a generally wide field of view and support stereoscopic computer vision. The various image sensors of the UAV 200 may enable visual inertial odometry (VIO) for high resolution localization and obstacle detection and avoidance. For example, the image sensors may be used to capture images including infrared data which may be processed for day or night mode navigation of the UAV 200. The UAV 200 also includes a battery in battery pack 220 attached on the bottom of the UAV 200, with conducting contacts 218 to enable battery charging. The bottom surface of the battery pack 220 may be a bottom surface of the UAV 200.

In some implementations, the UAV 200 may include one or more light blocking mechanisms for reducing or eliminating glare at an image sensor otherwise introduced by a light source. FIG. 2C is an illustration of an example of a portion of the UAV 200 including such a light blocking mechanism 222. The light blocking mechanism 222 includes a number of protrusions (e.g., four) coupled to a portion of an arm of the UAV 200. Openings 224 represent locations at which light sources may be coupled. The light sources may, for example, be infrared light emitting diode (LED) elements. In the example shown, two infrared LEDs may be coupled to the arm of the UAV 200. In at least some cases, the infrared LEDs may be omnidirectional. Openings 226 represent locations at which cameras may be coupled. The cameras may, for example, be cameras configured to collect image data including infrared data. In at least some cases, the cameras may have fisheye lenses. Thus, the cameras which may be coupled to the arm of the UAV 200 within the openings 226 may be cameras which do not use or have infrared filtering. In operation, without the light blocking mechanism 222, the light sources coupled to the openings 224 may shine directly into image sensors of the cameras coupled to the openings 226. This direct shining may introduce glare negatively affecting both the ability of the cameras to be used for vision-based navigation functionality of the UAV 200 as well as the quality of images generated based on the data collected using the cameras. The protrusions of the light blocking mechanism 222 thus operate to block light from the light sources coupled to the openings 224 from interfering with the cameras coupled to the openings 226, for example, by reducing or eliminating glare otherwise caused by the light sources directly reaching the image sensors of those cameras. In some implementations, a software infrared light filter may be used in addition to or in lieu of the light blocking mechanism 222.

Figure 3:
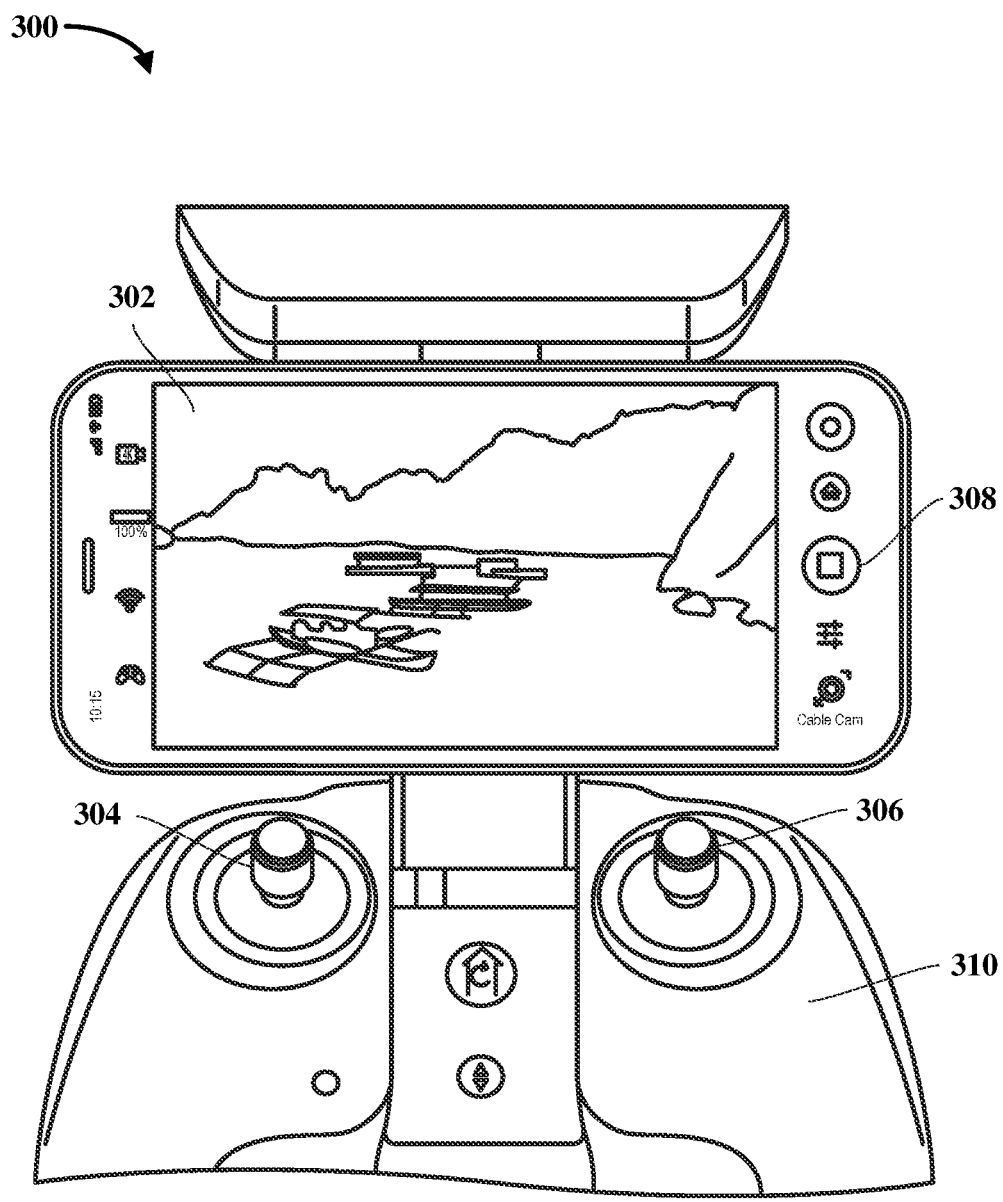
FIG. 3 is an illustration of an example of a controller for a UAV.

FIG. 3 is an illustration of an example of a controller 300 for a UAV, which may, for example, be the UAV 102 shown in FIG. 1. The controller 300 may, for example, be the controller 104 shown in FIG. 1. The controller 300 may provide a user interface for controlling the UAV and reviewing data (e.g., images) received from the UAV. The controller 300 includes a touchscreen 302, a left joystick 304, and a right joystick 306. In the example as shown, the touchscreen 302 is part of a mobile device 308 (e.g., a smartphone) that connects to a controller attachment 310, which, in addition to providing addition control surfaces including the left joystick 304 and the right joystick 306, may provide range extending communication capabilities for longer distance communication with the UAV.

Figure 4:
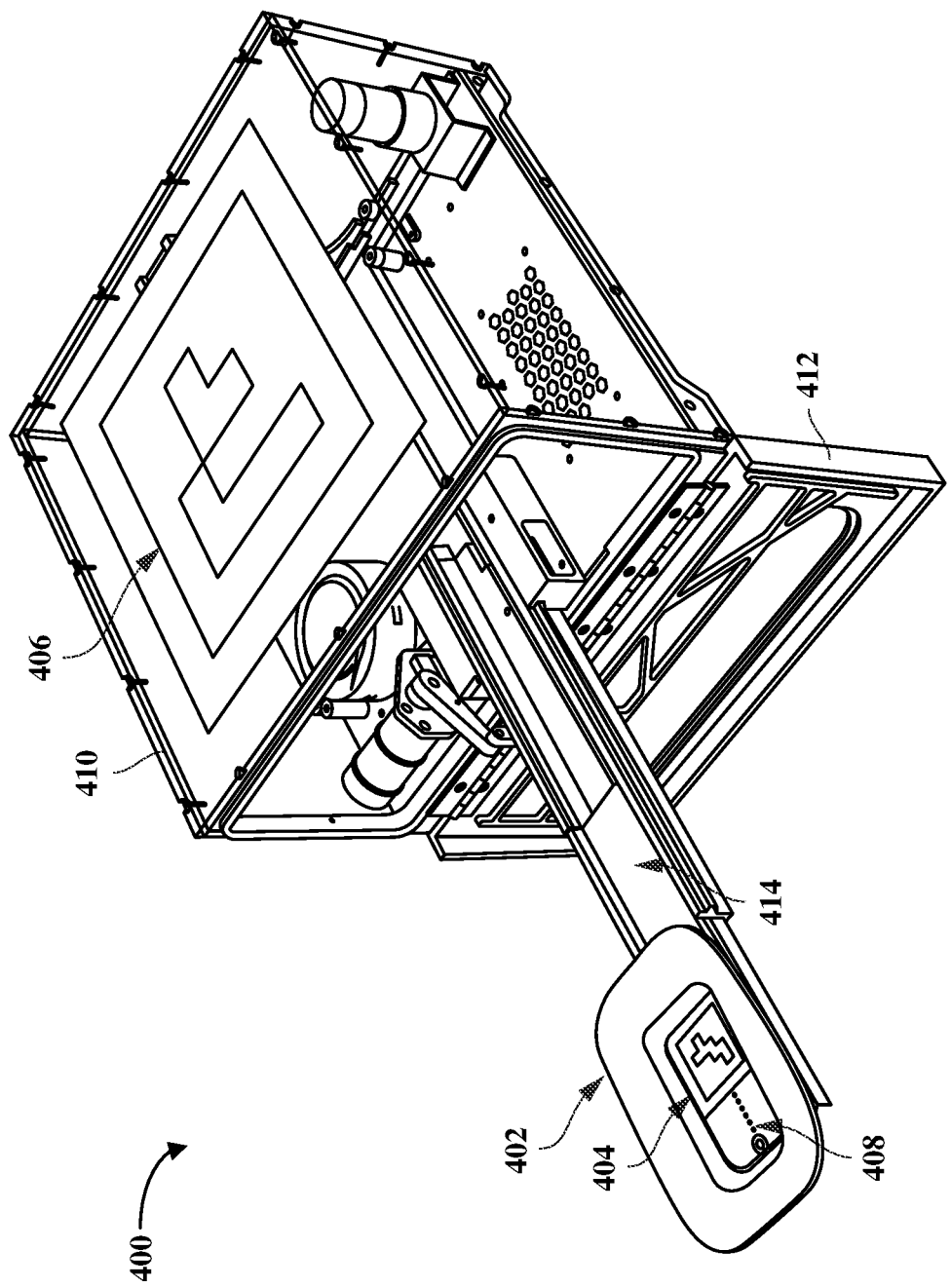
FIG. 4 is an illustration of an example of a dock for facilitating autonomous landing of a UAV

FIG. 4 is an illustration of an example of a dock 400 for facilitating autonomous landing of a UAV, for example, the UAV 102 shown in FIG. 1. The dock may, for example, be the dock 106 shown in FIG. 1. The dock 400 includes a landing surface 402 with a fiducial 404, charging contacts 406 for a battery charger, a box 408 in the shape of a rectangular box with a door 410, and a retractable arm 412.

The landing surface 402 is configured to hold a UAV. The UAV may be configured for autonomous landing on the landing surface 402. The landing surface 402 has a funnel geometry shaped to fit a bottom surface of the UAV at a base of the funnel. The tapered sides of the funnel may help to mechanically guide the bottom surface of the UAV into a centered position over the base of the funnel during a landing. For example, corners at the base of the funnel may server to prevent the aerial vehicle from rotating on the landing surface 402 after the bottom surface of the aerial vehicle has settled into the base of the funnel shape of the landing surface 402. For example, the fiducial 404 may include an asymmetric pattern that enables robust detection and determination of a pose (i.e., a position and an orientation) of the fiducial 404 relative to the UAV based on an image of the fiducial 404, for example, captured with an image sensor of the UAV.

The conducting contacts 406 are contacts of a battery charger on the landing surface 402, positioned at the bottom of the funnel. The dock 400 includes a charger configured to charge a battery of the UAV while the UAV is on the landing surface 402. For example, a battery pack of the UAV (e.g., the battery pack 220 shown in FIG. 2) may be shaped to fit on the landing surface 402 at the bottom of the funnel shape. As the UAV makes its final approach to the landing surface 402, the bottom of the battery pack will contact the landing surface and be mechanically guided by the tapered sides of the funnel to a centered location at the bottom of the funnel. When the landing is complete, the conducting contacts of the battery pack may come into contact with the conducting contacts 406 on the landing surface 402, making electrical connections to enable charging of the battery of the UAV. The dock 400 may include a charger configured to charge the battery while the UAV is on the landing surface 402.

The box 408 is configured to enclose the landing surface 402 in a first arrangement and expose the landing surface 402 in a second arrangement. The dock 400 may be configured to transition from the first arrangement to the second arrangement automatically by performing steps including opening the door 410 of the box 408 and extending the retractable arm 412 to move the landing surface 402 from inside the box 408 to outside of the box 408.

The landing surface 402 is positioned at an end of the retractable arm 412. When the retractable arm 412 is extended, the landing surface 402 is positioned away from the box 408 of the dock 400, which may reduce or prevent propeller wash from the propellers of a UAV during a landing, thus simplifying the landing operation. The retractable arm 412 may include aerodynamic cowling for redirecting propeller wash to further mitigate the problems of propeller wash during landing. The retractable arm supports the landing surface 402 and enables the landing surface 402 to be positioned outside the box 408, to facilitate takeoff and landing of a UAV, or inside the box 408, for storage and/or servicing of a UAV.

In some implementations, the dock 400 includes a second, auxiliary fiducial 414 on an outer surface of the box 408. The root fiducial 404 and the auxiliary fiducial 414 may be detected and used for visual localization of the UAV in relation the dock 400 to enable a precise landing on a small landing surface 402. For example, the fiducial 404 may be a root fiducial, and the auxiliary fiducial 414 is larger than the root fiducial 404 to facilitate visual localization from farther distances as a UAV approaches the dock 400. For example, the area of the auxiliary fiducial 414 may be 25 times the area of the root fiducial 404. For example, the auxiliary fiducial 414 may include an asymmetric pattern that enables robust detection and determination of a pose (i.e., a position and an orientation) of the auxiliary fiducial 414 relative to the UAV based on an image of the auxiliary fiducial 414 captured with an image sensor of the UAV.

Although not illustrated, in some implementations, the dock 400 can include one or more network interfaces for communicating with remote systems over a network, for example, the Internet, a local area network, a wide area network, or another public or private network. The communication may include flight patterns or other flight pattern information. Additionally, the dock 400 can include one or more wireless interfaces for communicating with UAVs, for example, for controlling and/or otherwise providing the UAVs with flight patterns or flight pattern information.

Figure 5:
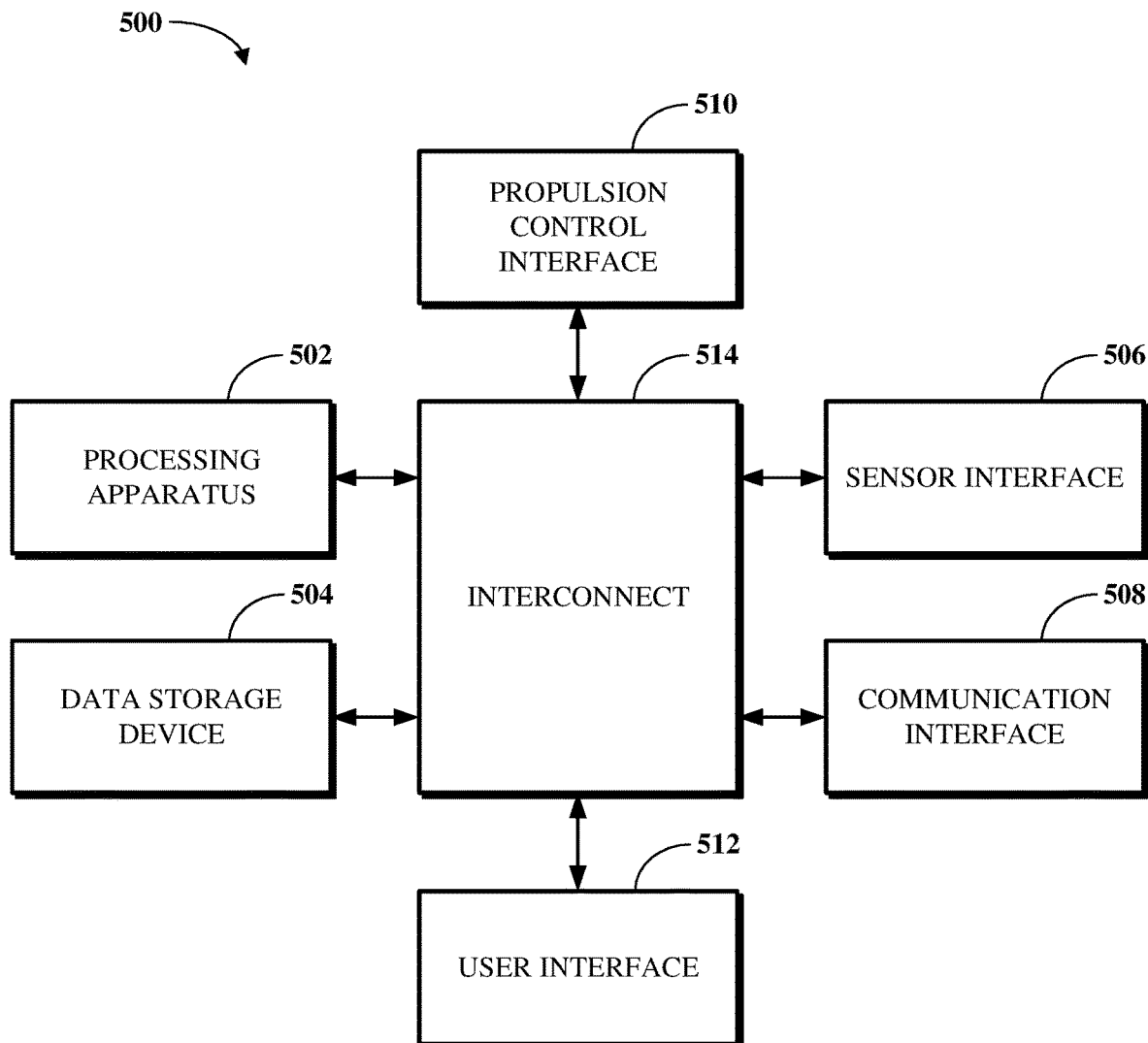
FIG. 5 is a block diagram of an example of a hardware configuration of a UAV.

FIG. 5 is a block diagram of an example of a hardware configuration of a UAV 500, which may, for example, be the UAV 102 shown in FIG. 1. The UAV 500 includes a processing apparatus 502, a data storage device 504, a sensor interface 506, a communications interface 508, propulsion control interface 510, a user interface 512, and an interconnect 514 through which the processing apparatus 502 may access the other components.

The processing apparatus 502 is operable to execute instructions that have been stored in the data storage device 504 or elsewhere. The processing apparatus 502 is a processor with random access memory (RAM) for temporarily storing instructions read from the data storage device 504 or elsewhere while the instructions are being executed. The processing apparatus 502 may include a single processor or multiple processors each having single or multiple processing cores. Alternatively, the processing apparatus 502 may include another type of device, or multiple devices, capable of manipulating or processing data.

The data storage device 504 is a non-volatile information storage device, for example, a solid-state drive, a read-only memory device (ROM), an optical disc, a magnetic disc, or another suitable type of storage device such as a non-transitory computer readable memory. The data storage device 504 may include another type of device, or multiple devices, capable of storing data for retrieval or processing by the processing apparatus 502. The processing apparatus 502 may access and manipulate data stored in the data storage device 504 via the interconnect 514, which may, for example, be a bus or a wired or wireless network (e.g., a vehicle area network).

The sensor interface 506 is configured to control and/or receive data from one or more sensors of the UAV 500. The data may refer, for example, to one or more of temperature measurements, pressure measurements, a global positioning system (GPS) data, acceleration measurements, angular rate measurements, magnetic flux measurements, a visible spectrum image, an infrared image, an image including infrared data and visible spectrum data, and/or other sensor output. For example, the one or more sensors from which the data is generated may include single or multiple of one or more of an image sensor, an accelerometer, a gyroscope, a geolocation sensor, a barometer, and/or another sensor. In some implementations, the sensor interface 506 may implement a serial port protocol (e.g., I2C or SPI) for communications with one or more sensor devices over conductors. In some implementations, the sensor interface 506 may include a wireless interface for communicating with one or more sensor groups via low-power, short-range communications techniques (e.g., using a vehicle area network protocol).

The communications interface 508 facilitates communication with one or more other devices, for example, a paired dock (e.g., the dock 106), a controller (e.g., the controller 104), or another device, for example, a user computing device (e.g., a smartphone, tablet, or other device). The communications interface 508 may include a wireless interface and/or a wired interface. For example, the wireless interface may facilitate communication via a Wi-Fi network, a Bluetooth link, a ZigBee link, or another network or link. In another example, the wired interface may facilitate communication via a serial port (e.g., RS-232 or USB). The communications interface 508 further facilitates communication via a network, which may, for example, be the Internet, a local area network, a wide area network, or another public or private network.

The propulsion control interface 510 is used by the processing apparatus to control a propulsion system of the UAV 500 (e.g., including one or more propellers driven by electric motors). For example, the propulsion control interface 510 may include circuitry for converting digital control signals from the processing apparatus 502 to analog control signals for actuators (e.g., electric motors driving respective propellers). In some implementations, the propulsion control interface 510 may implement a serial port protocol (e.g., I2C or SPI) for communications with the processing apparatus 502. In some implementations, the propulsion control interface 510 may include a wireless interface for communicating with one or more motors via low-power, short-range communications (e.g., a vehicle area network protocol).

The user interface 512 allows input and output of information from/to a user. In some implementations, the user interface 512 can include a display, which can be a liquid crystal display (LCD), a light emitting diode (LED) display (e.g., an OLED display), or another suitable display. In some such implementations, the user interface 512 may be or include a touchscreen. In some implementations, the user interface 512 may include one or more buttons. In some implementations, the user interface 512 may include a positional input device, such as a touchpad, touchscreen, or the like, or another suitable human or machine interface device.

In some implementations, the UAV 500 may include one or more additional components not shown in FIG. 5. In some implementations, one or more components shown in FIG. 5 may be omitted from the UAV 500, for example, the user interface 512.

Figure 6:
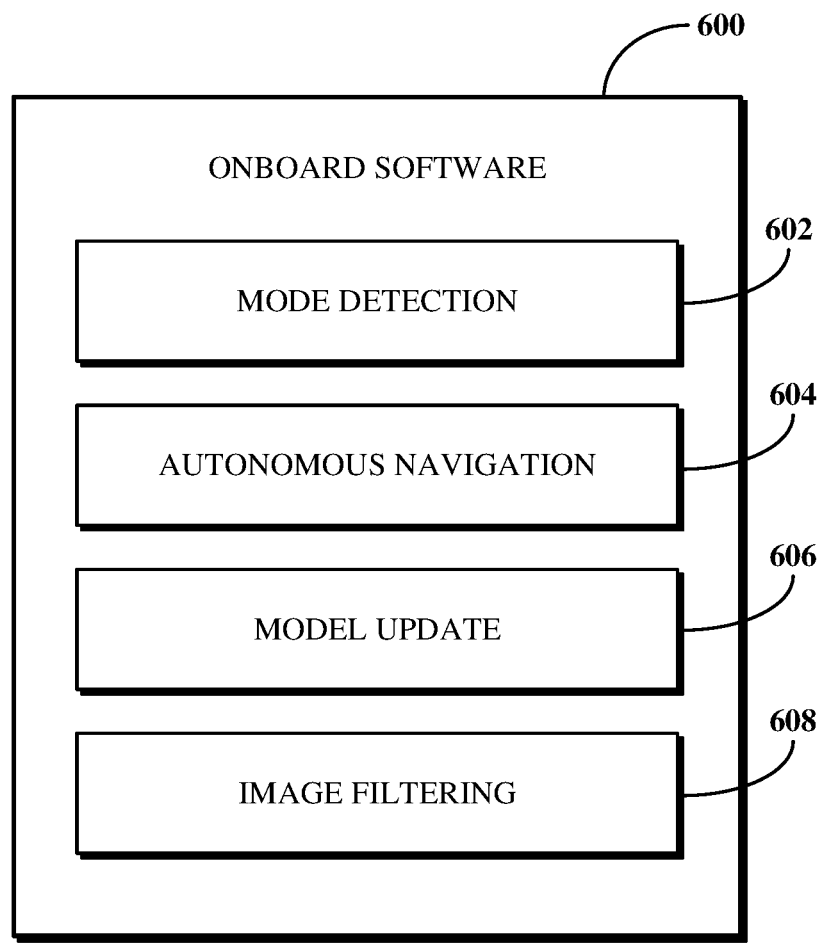
FIG. 6 is a block diagram of example software functionality of a UAV system.

FIG. 6 is a block diagram of example software functionality of a UAV system, which may, for example, be the system 100 shown in FIG. 1. In particular, the software functionality is represented as onboard software 600 running at a UAV, for example, the UAV 102 shown in FIG. 1. The onboard software 600 includes a mode detection tool 602, an autonomous navigation tool 604, a model update tool 606, and an image filtering tool 608.

The mode detection tool 602 configures the UAV for operation in either a day mode or a night mode. The mode detection tool 602 configures the UAV for day mode operation where a determination is made that an amount of light within the environment in which the UAV is located is sufficient for vision-based navigation of the UAV without use of light sources onboard the UAV. The determination as to whether the amount of light within the environment in which the UAV is located is sufficient for vision-based navigation may be based on one or more of a threshold defined for one or more cameras used for the vision-based navigation, an exposure setting for those one or more cameras, a measurement of light within the environment using another sensor onboard the UAV or another sensor the output of which is reportable to the UAV system, or the like. For example, determining whether to configure the UAV in a day mode configuration or the night mode configuration based on an amount of light within the environment in which the UAV is operating can include measuring an intensity of light within the environment in which the UAV is operating, and automatically configuring the UAV in one of a day mode configuration or a night mode configuration based on the intensity of light, wherein the UAV is automatically configured in the day mode configuration based on the intensity of light meeting a threshold or in the night mode configuration based on the intensity of light not meeting the threshold. The determination may be made prior to takeoff. Alternatively, the determination may be made after some or all takeoff operations have been performed.

The mode detection tool 602 determines which of day mode or night mode applies at a given time and so that configurations of that determined mode may be applied for the operation of the UAV. In particular, when a determination is made to use day mode configurations, onboard light sources (e.g., infrared LEDs) of the UAV may be temporarily disabled to prevent unnecessary or otherwise undesirable illumination. For example, temporarily and selectively disabling infrared LEDs may limit an amount of infrared light which is collected by the image sensors of the cameras used for the vision-based navigation of the UAV in day mode. Other configuration changes to the UAV may also be made as a result of switching from day mode to night mode or from night mode to day mode.

The autonomous navigation tool 604 includes functionality for enabling autonomous flight of the UAV. Regardless of whether the UAV is in day mode or night mode, autonomous flight functionality of the UAV generally includes switching between the use of cameras for vision-based navigation and the use of a global navigation satellite system (GNSS) and an inertial measurement unit (IMU) onboard the UAV for position-based navigation. In particular, autonomous flight of the UAV may use position-based navigation where objects within an environment in which the UAV is operating are determined to be at least some distance away from the UAV, and autonomous flight of the UAV may instead use vision-based navigation where those objects are determined to be less than that distance away from the UAV.

With position-based navigation, the UAV may receive a series of location signals through a GNSS receiver. The received GNSS signals may be indicative of locations of the UAV within a world frame of reference. The UAV may use the location signals from the GNSS receiver to determine a location and velocity of the UAV. The UAV may determine an acceleration signal and an orientation signal within a navigation frame of reference based on acceleration signals from one or more accelerometers and angular rate signals from one or more gyroscopes, such as which may be associated with the IMU onboard the UAV.

With vision-based navigation, one or more onboard cameras of the UAV may continuously or otherwise periodically collect data usable to generate images. The image may be processed in real-time or substantially in real-time to identify objects within the environment in which the UAV is operated and to determine a relative position of the UAV with respect to those objects. Depth estimation may be performed to determine the relative position of the UAV with respect to an object. Performing depth estimation includes modeling depth values for various pixels of the images generated based on the data collected using the onboard cameras. A depth value may, for example, be modeled according to RGB inputs collected for a subject pixel. Based on the depth estimation values and output from the onboard IMU, the trajectory of the UAV toward a detected object may be evaluated to enable the UAV to avoid object collision.

The manner by which autonomous flight functionality is achieved using vision-based navigation or position-based navigation depends upon whether the UAV is in day mode or night mode. As described above with respect to FIG. 2C, the UAV may include one or more cameras which do not have or use infrared filters. These onboard cameras thus collect image data which includes infrared data. However, as has been noted, infrared data can obscure the ultimate look of an image and thus may interfere with conventional image processing for vision-based navigation. Thus, when the UAV is in day mode, infrared data may be filtered out of the images used for vision-based navigation, for example, as described below with respect to the image filtering tool 608. The infrared filtered images may then be processed using RGB-based depth estimation as described above.

When the UAV is in night mode, and thus while infrared LEDs onboard the UAV are used to illuminate the environment in which the UAV is operating, the cameras will collect infrared data and a different technique for depth estimation in the infrared domain is used. In particular, in night mode, the autonomous navigation tool 604 uses intelligence for low-light and no-light depth estimation within the infrared domain. The intelligence may be an algorithm, a learning model, or other aspect configured to take in some input in the form of image data including infrared data and generate some output usable by or for the vision-based navigation functionality of the UAV.

It is further noted that, due to the limited range of infrared LEDs, illumination reflections received by the onboard cameras of the UAV based on infrared light may result in the vision-based navigation functionality of the UAV being less reliable at some ranges than if that functionality otherwise used non-infrared light. Thus, in night mode, the distance representing the threshold at which vision-based navigation is used may be less than the distance used in day mode.

The model update tool 606 includes functionality related to the updating of a learning model as the intelligence used by the autonomous navigation tool 604 for vision-based navigation of the UAV using infrared data in night mode. The model update tool 606 maintains a copy of the learning model at the UAV and applies updates to the learning model based on changes made at a server at which the learning model is trained. For example, the model update tool 606 may receive updates to the learning model from the server, such as over a network. In some implementations, the model update tool 606 may further select, determine, or identify one or more images captured by the onboard cameras of the UAV to use for training the learning model. For example, the images may be images captured without infrared data or from which infrared data has been filtered out.

The learning model may be or include one or more of a neural network (e.g., a convolutional neural network, recurrent neural network, or other neural network), decision tree, vector machine, Bayesian network, genetic algorithm, deep learning system separate from a neural network, or other learning model. The learning model applies intelligence to identify complex patterns in the input and to leverage those patterns to produce output and refine systemic understanding of how to process the input to produce the output. In implementations where the intelligence is an algorithm or other aspect, the model update tool 606 uses functionality as described above for updating the algorithm or other aspect.

The image filtering tool 608 filters images generated using collected image data which includes infrared data to remove the infrared data therefrom. Because night mode operation of the UAV includes the use of infrared data, the image filtering tool 608 may include or otherwise refer to functionality performed for images generated while the UAV is in day mode. Thus, when the UAV is in day mode and an image is generated using image data collected from one or more onboard cameras of the UAV, that image data is processed using the image filtering tool 608 to prepare the image data for use in vision-based navigation for the UAV.

Filtering the image data to remove infrared data therefrom includes modifying the appearance of the image data, which may have a somewhat pink tonal appearance than image data collected using a camera which has or uses an infrared filter, to reduce or eliminate those pink tones. Those pink tones skew the perceptible quality of images and thus may negatively impact the functionality of day mode vision-based navigation and/or the overall appearance and quality of output presented to the operator the UAV. The filter applied by the image filtering tool 608 may be modeled based on software infrared filters which may be used for cameras. Alternatively, the filter applied by the image filtering tool 608 may be modeled using a learning model or other intelligence trained for infrared data removal.

In some implementations, the image filtering tool 608 may be omitted. For example, the UAV may include both cameras which have or use infrared filters and cameras which do not have or use infrared filters. A camera which has or uses an infrared filter may use a software process for infrared filtering, a mechanical component for infrared filtering, or both. The cameras which have or use the infrared filters may be used for vision-based navigation of the UAV while the UAV is in day mode, and the cameras which do not have or use infrared filters may be used for vision-based navigation of the UAV while the UAV is in night mode. In another example, the autonomous navigation tool 604 and other aspects disclosed herein may operate against images that include both visible and infrared light.

Figure 7:
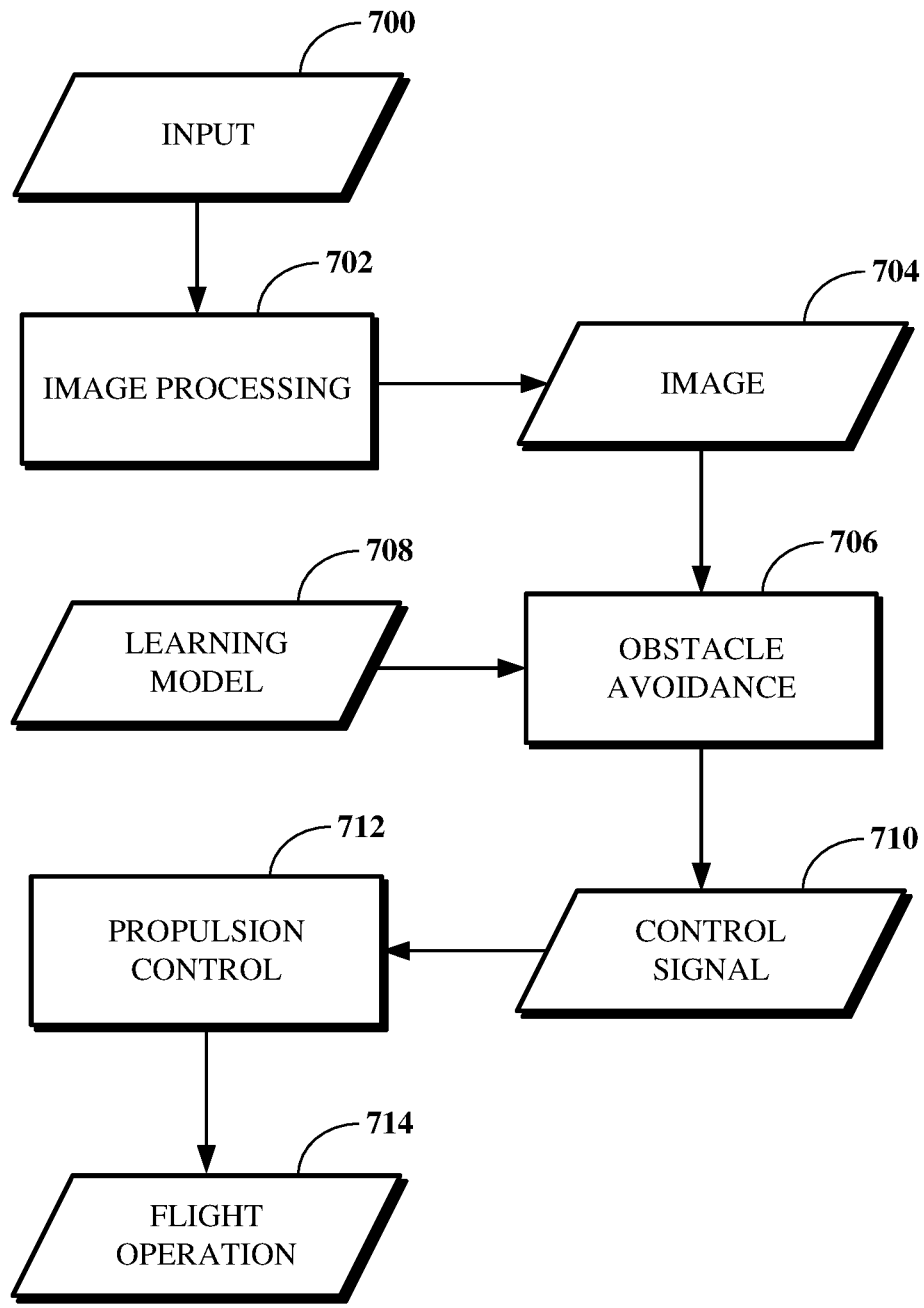
FIG. 7 is a block diagram of an example of UAV navigation using night mode obstacle avoidance intelligence.

FIG. 7 is a block diagram of an example of UAV navigation using night mode obstacle avoidance intelligence. At least some of the operations shown and described with respect to FIG. 7 may, for example, be performed by or using the automated navigation tool 604 shown in FIG. 6. Input 700 representing input which can be collected by a camera of a UAV, for example, the UAV 102 shown in FIG. 1, is collected and processed using an image processing tool 702 to produce an image 704. The input 700 may, for example, include image data including infrared data measured using an image sensor of an onboard camera of the UAV. The image processing tool 702 represents software usable to produce the image 704 from the input 700. The image 704 is produced based on the infrared data of the input 700 and thus includes infrared aspects. However, in some implementations, the image 704 may be produced based on data other than infrared data. For example, the input 700 may include data measured from visible light and/or another form of light other than infrared light.

The image 704 is provided to an obstacle avoidance tool 706, which uses a learning model 708 trained for depth estimation for night mode images to detect objects within the image 704. The training of the learning model 708 is described below with respect to FIG. 8. The learning model 708 takes the image 704 as input and indicates a detection of a number of objects within the image 704 as the output. Where objects are detected, the obstacle avoidance tool 706 uses the indication output by the learning model 708 to determine a flight operation to prevent a collision by the UAV with the detected obstacle. The flight operation includes or refers to a maneuver for the UAV which changes a current path of the UAV to prevent the UAV from colliding with the detected object. In some implementations, other intelligence may be used in place of the learning model 708. For example, the obstacle avoidance tool 708 may use an algorithm or other intelligence aspect configured to take the image 704 as input and indicate a detection of a number of objects within the image 704 as the output.

The obstacle avoidance tool 706 outputs a control signal 710 including a command configured to cause the flight operation for preventing the collision by the UAV with the detected obstacle. The control signal 710 is received and processed by a propulsion control tool 712 of the UAV. The propulsion control tool 712 is configured to interface with one or more components associated with a propulsion system of the UAV to implement the flight operation associated with the control signal 710. The output of the propulsion control tool 712 is a flight operation 714 performed or performable by the UAV.

Figure 8:
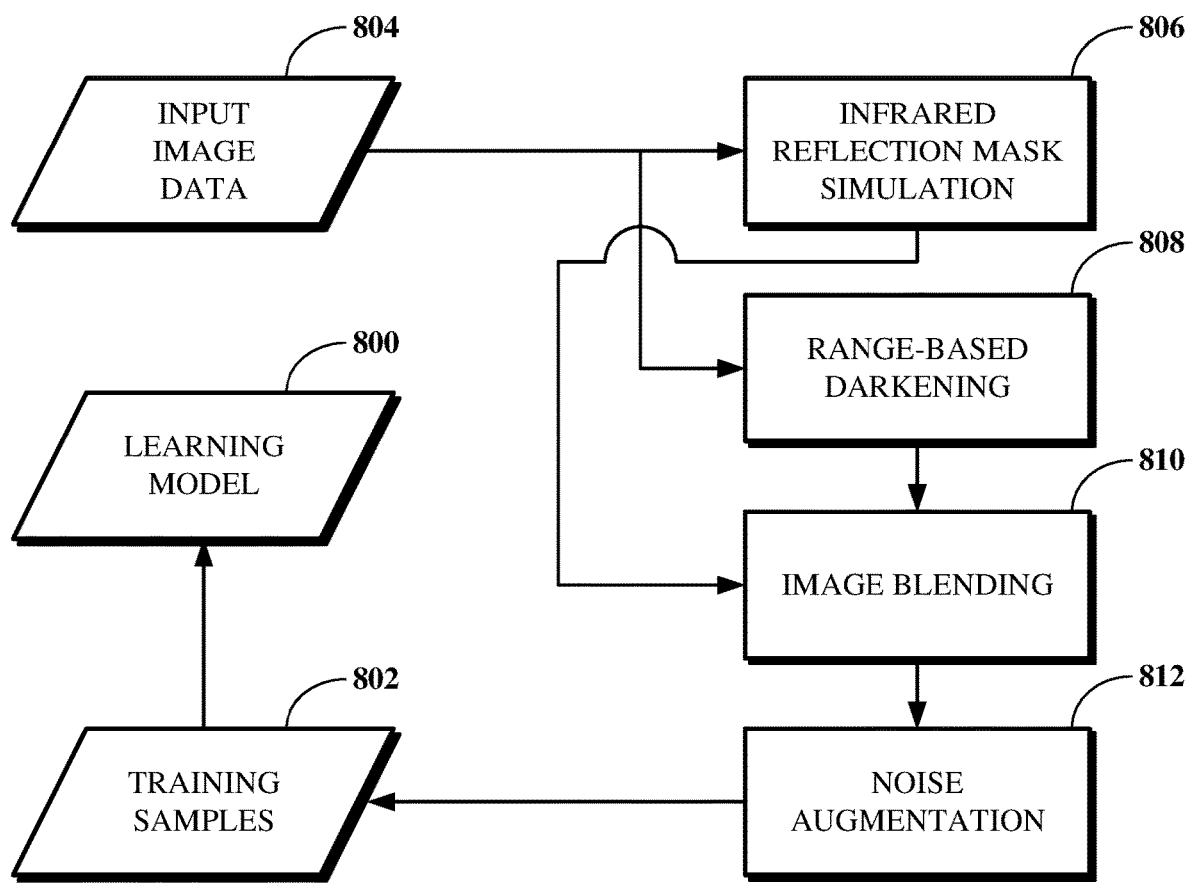
FIG. 8 is a block diagram of an example of a learning model trained for night mode obstacle avoidance.

FIG. 8 is a block diagram of an example of a learning model 800 trained for night mode obstacle avoidance. The learning model 800 may, for example, be the learning model 708 used for night mode obstacle avoidance intelligence. The learning model 800 is trained using training samples 802 produced by processing input image data 804. The input image data 804 are images generated based on image data collected by a camera having or using an infrared filter or otherwise after infrared data has been removed therefrom. The training samples 802 are images resulting from the processing of the input image data 804 to represent the images of the input image data 804 as if they had been generated in night mode without the use of infrared filtering. The training of the learning model 800 thus is to prepare an intelligence for vision-based navigation of the UAV in night mode. The learning model 800 may be trained at a server of a UAV system, for example, the server 108 shown in FIG. 1.

To produce the training samples 802 from the input image data 804, a first copy of the input image data 804 is first processed using an infrared reflection mask simulation tool 806. The infrared reflection mask simulation tool 806 simulates a reflection of infrared data from onboard infrared LEDs of the UAV to understand how that reflection could have interacted with exposure features of the camera or cameras which collected the input image data 804. The output of the infrared reflection mask simulation tool 806 may thus be a determination of a range of the simulated infrared illumination within the environment depicted by the input image data 804.

At the same time as the infrared reflection mask simulation tool 806 is processing the first copy of the input image data 804, or before or after such processing, a second copy of the input image data 804 is processed by a range-based darkening tool 808. The range-based darkening tool 808 darkens RGB values within parts of the input image data 804. The parts to darken are determined based on an expected range of infrared illumination. Thus, parts of the input image data 804 which are within the determined range (e.g., from the point of origin, being the camera of the UAV) are not processed by the range-based darkening tool 808, and the remaining parts of the input image data 804 (e.g., parts beyond the determined range) are darkened. Darkening those parts may include applying a darkening filter to darken RGB values of pixels, remove brightness, and/or otherwise darken the respective input image data 804.

The output of the infrared reflection mask simulation tool 806 and the output of the range-based darkening tool 808 are then received as input to an image blending tool 810. The image blending tool 810 blends those outputs, which are images modified either by an infrared reflection mask or by darkening, to produce a blended image which includes both the infrared reflection mask adjustment values and the darkened values. Blending the output of the infrared reflection mask simulation tool and the output of the range-based darkening tool 808 may include combining a first image representing the output of the infrared reflection mask simulation tool 806 and a second image representing the output of the range-based darkening tool 808.

The output of the image blending tool 810 is then received at and processed by a noise augmentation tool 812. The noise augmentation tool 812 introduces camera noises to the image produced by the image blending tool 810 to cause the image to appear as if it had been produced using a camera. The camera noises include artifacts typically introduced by the image capture process using a camera, for example, based on light exposure and other factors.

The training samples 802 are the output of the noise augmentation tool 812. As a result of the processing performed by the infrared reflection mask simulation tool 806, the range-based darkening tool 808, the image blending tool 810, and the noise augmentation tool 812, the training samples 802 represent image data simulated to include infrared data and which may have effectively been collected at a UAV during night mode. The training samples 802 are then used to train the learning model 800 for depth estimation. The learning model 800, once trained, or after updates, may be transmitted to a UAV for use in automated navigation, for example, using the model update tool 606 shown in FIG. 6.

Figure 9:
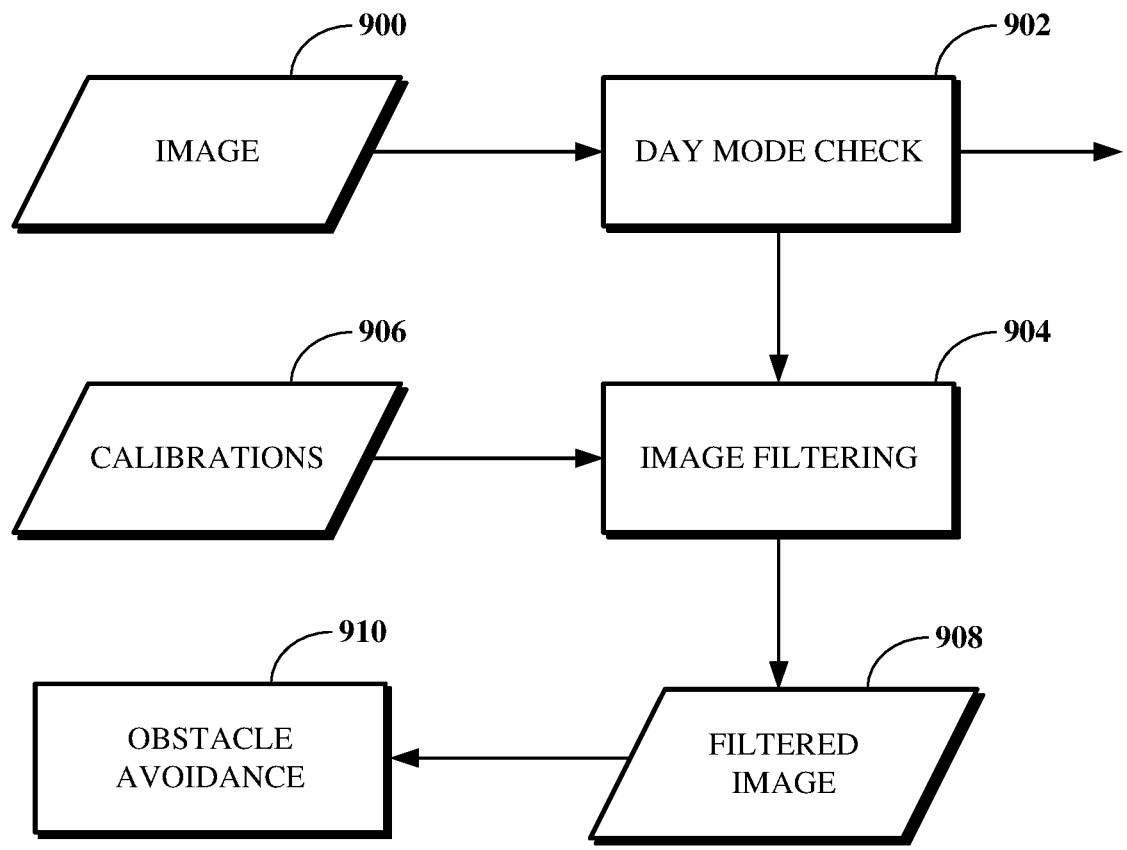
FIG. 9 is a block diagram of an example of UAV navigation in day mode by filtering infrared data from images.

FIG. 9 is a block diagram of an example of UAV navigation in day mode by filtering infrared data from images. At least some of the operations shown and described with respect to FIG. 9 may, for example, be performed by or using the image filtering tool 608 shown in FIG. 6. An image 900 is produced by image processing functionality of a UAV (e.g., the image processing tool 702 shown in FIG. 7) based on image data including infrared data collected by a camera of the UAV. The image 900 may, for example, be the image 704 shown in FIG. 7 and thus includes infrared data. A day mode check tool 902 checks whether the UAV is operating in day mode or night mode. Where the day mode check tool 902 determines that the UAV is operating in night mode, the remaining operations shown and described with respect to FIG. 9 are bypassed and the image 900 is further processed for autonomous vision-based navigation without filtering.

Where the day mode check tool 902 determines that the UAV is operating in day mode, an image filtering tool 904 performs filtering against the image 900 based on calibrations 906 to produce a filtered image 908. The filtering performed by the image filtering tool 904 reduces or otherwise entirely removes infrared data from the image 900. Thus, the filtered image 908 represents the image 900 with less or otherwise without infrared data. The image filtering tool 904 may, for example, apply a filter for removing pink tones within the image 900 resulting from the collection of infrared data and use of same to produce the image 900. The calibrations include or refer to settings used for the filtering performed by the image filtering tool 904. In some implementations, the calibrations may be defined based on one or more configurations of the camera used to collect the image data processed to produce the image 900.

The filtered image 908 is thereafter used as input to an obstacle avoidance tool 910, which processes the filtered image to detect a number of objects within an environment in which the UAV is operating. Autonomous vision-based navigation in day mode is then facilitated based on the output of the obstacle avoidance tool 910.

Figure 10:
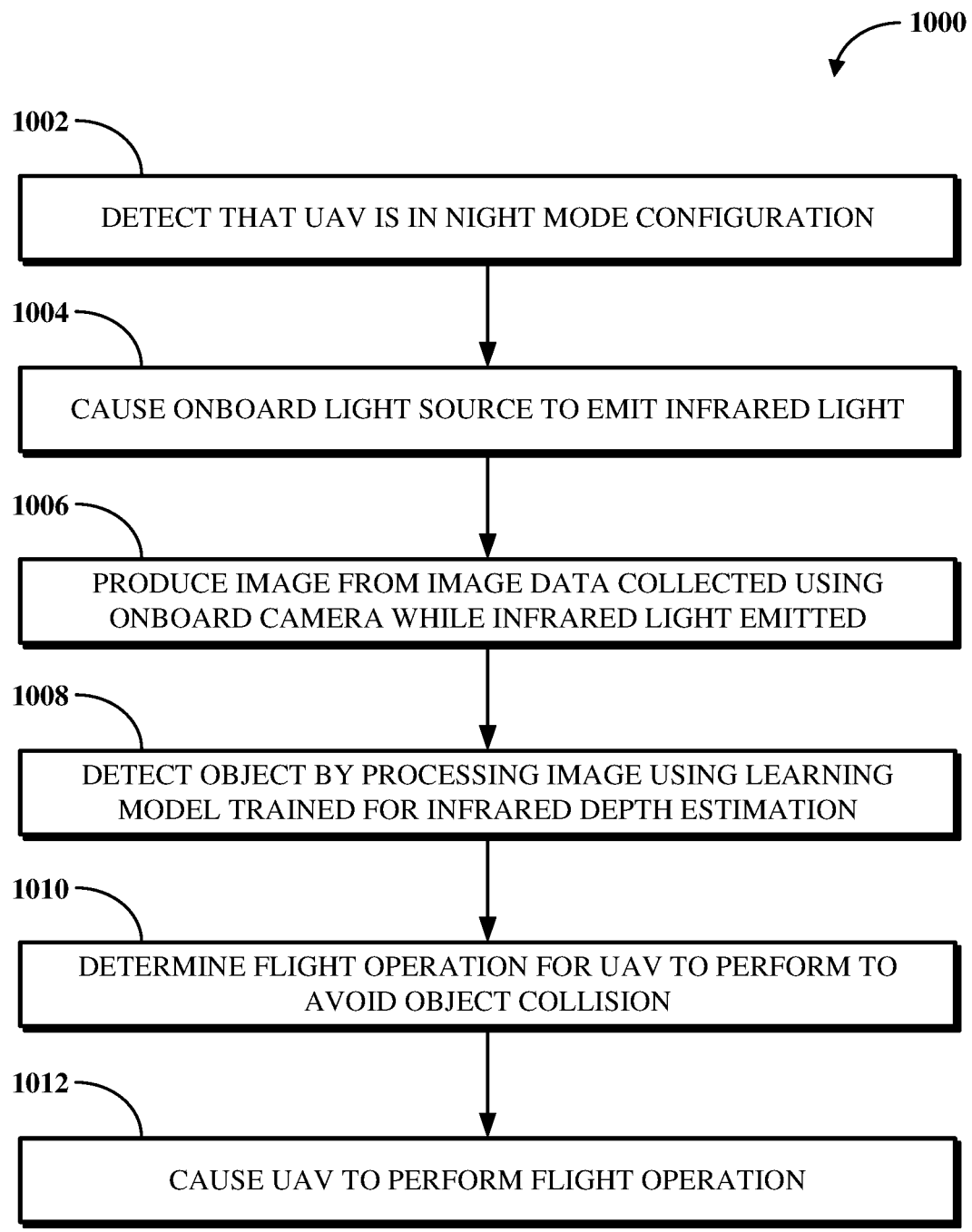
FIG. 10 is a flowchart of an example of a technique for night mode obstacle avoidance using a learning model trained using infrared data.
Figure 11:
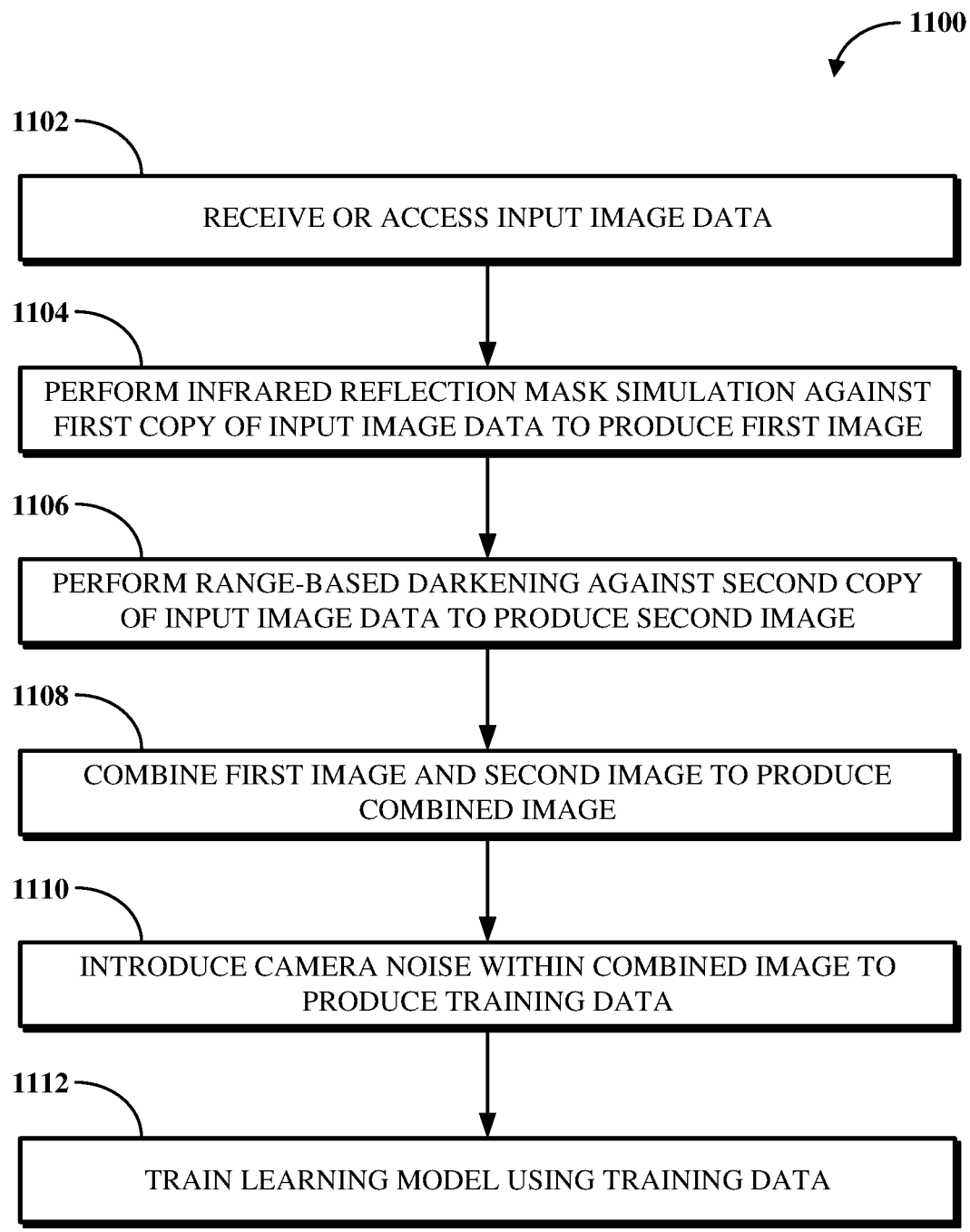
FIG. 11 is a flowchart of an example of a technique for training a learning model by synthetic generation and simulation of infrared data.
Figure 12:
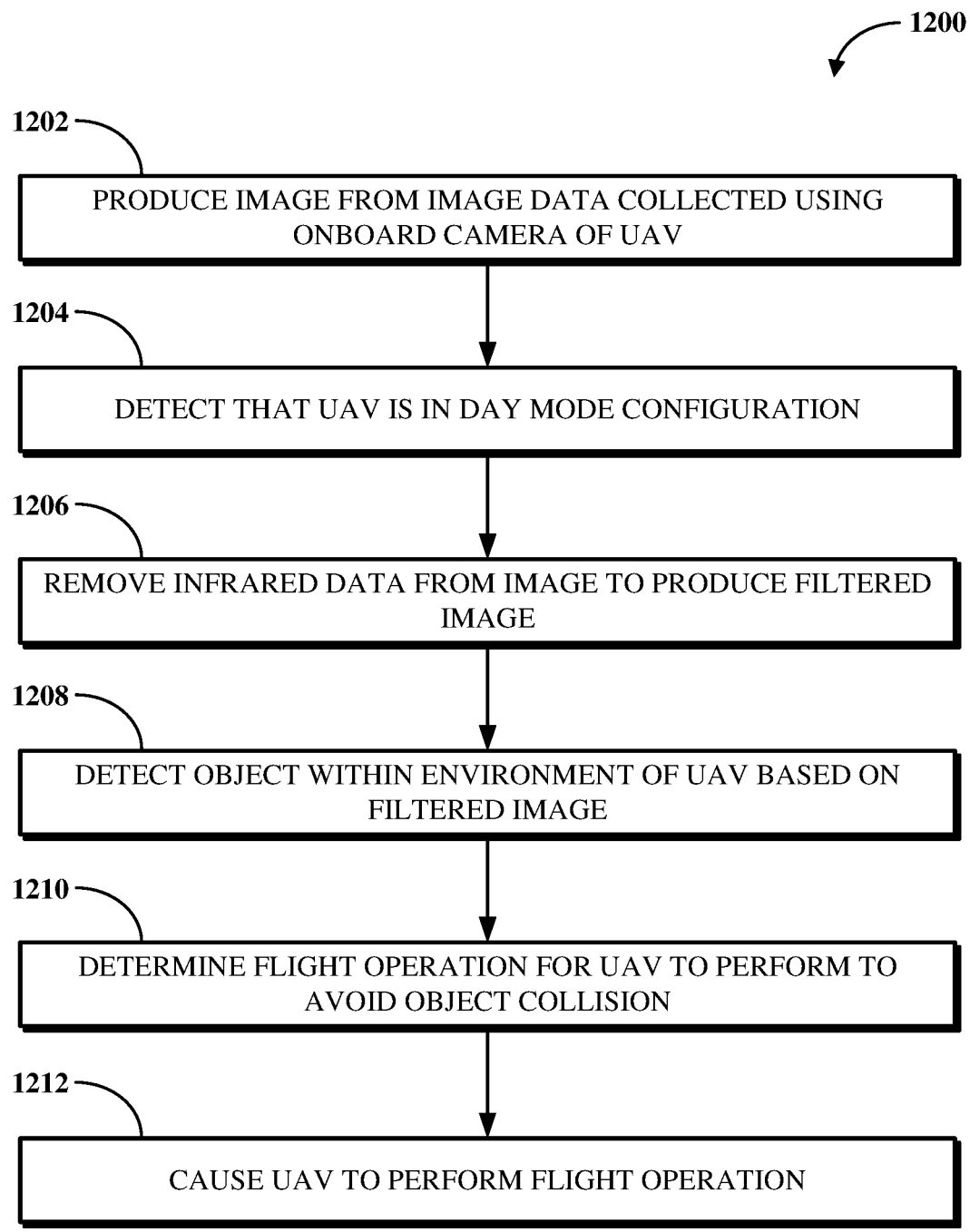
FIG. 12 is a flowchart of an example of a technique for filtering infrared data from images processed during day mode operations of a UAV.

To further describe some implementations in greater detail, reference is next made to examples of techniques for autonomous aerial navigation in low-light and no-light conditions, for example, as described with respect to FIGS. 1-9. FIG. 10 is a flowchart of an example of a technique 1000 for night mode obstacle avoidance using a learning model trained using infrared data. FIG. 11 is a flowchart of an example of a technique 1100 for training a learning model by synthetic generation and simulation of infrared data. FIG. 12 is a flowchart of an example of a technique 1200 for filtering infrared data from images processed during day mode operations of a UAV.

The techniques 1000, 1100, and/or 1200 can be executed using computing devices, such as the systems, hardware, and software described with respect to FIGS. 1-9. The techniques 1000, 1100, and/or 1200 can be performed, for example, by executing a machine-readable program or other computer-executable instructions, such as routines, instructions, programs, or other code. The steps, or operations, of the techniques 1000, 1100, and/or 1200 or another technique, method, process, or algorithm described in connection with the implementations disclosed herein can be implemented directly in hardware, firmware, software executed by hardware, circuitry, or a combination thereof.

For simplicity of explanation, the techniques 1000, 1100, and 1200 are each depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 10, the flowchart of the example of the technique 1000 for night mode obstacle avoidance using a learning model trained using infrared data is shown. At 1002, a UAV is detected to be in a night mode configuration based on an amount of light within an environment in which the UAV is operating. At 1004, an onboard light source of the UAV is caused to emit an infrared light based on the night mode configuration of the UAV. At 1006, an image is produced from image data collected using an onboard camera of an UAV while the onboard light source emits the infrared light, in which the image data includes infrared data. At 1008, an object is detected within the environment in which the UAV is operating by processing the image using a learning model trained for depth estimation of infrared images. At 1010, a flight operation for the UAV to perform to avoid a collision with the object is determined. At 1012, the UAV is caused to perform the flight operation.

In some implementations, the technique 1000 may be performed to cause a performance of a flight operation based on light other than infrared light emitted from an onboard light source of the UAV. For example, an onboard light source of the UAV may be equipped or otherwise configured to emit visible light and/or another form of light other than infrared light. In such a case, an image may be produced from image data collected using the onboard camera of the UAV while the onboard light source of the UAV emits that visible light and/or other form of light, an object may be detected within the environment in which the UAV is operating based on the age, and the flight operation to be performed to avoid a collision with that object may be determined.

Referring next to FIG. 11, the flowchart of the example of the technique 1100 for training a learning model by synthetic generation and simulation of infrared data is shown. At 1102, input image data is received or accessed. For example, the input image data may be received from a UAV including a camera used to collect the input image data. In another example, the input image data may be accessed from a memory which stores the input image data. At 1104, infrared reflection mask simulation is performed against a first copy of input image data to produce a first image including infrared data. At 1106, range-based darkening is performed against a second copy of the input image data to produce a second image including darkened RGB color data. At 1108, the first image and the second image are combined to produce a combined image including the infrared data and the darkened RGB color data. At 1110, camera noise is introduced within the combined image to produce training data. At 1112, the learning model is trained using the training data.

Referring finally to FIG. 12, the flowchart of the example of the technique 1200 for filtering infrared data from images processed during day mode operations of a UAV is shown. At 1202, an image is produced from image data collected using an onboard camera of a UAV, wherein the image data includes infrared data. At 1204, the UAV is detected to be in a day mode configuration based on an amount of light within an environment in which the unmanned aerial vehicle is operating. At 1206, at least some of the infrared data is removed from the image based on the day mode configuration and calibrations associated with the onboard camera to produce a filtered image. At 1208, an object is detected within the environment in which the UAV is operating based on the filtered image. At 1210, a flight operation for the UAV to perform to avoid a collision with the object is determined. At 1212, the UAV is caused to perform the flight operation.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices.

Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus, comprising:
   a memory configured to store instructions for training a learning model for use with unmanned aerial vehicle navigation; and
   a processor configured to execute the instructions stored in the memory to:
      produce a first image including infrared data from an infrared light onboard an unmanned aerial vehicle by simulating a reflection of the infrared data to determine a simulated infrared illumination range within an environment depicted by a first copy of input image data;
      perform range-based darkening against a second copy of the input image data to produce a second image including darkened RGB color data;
      combine the first image and the second image to produce a combined image; and
      train the learning model based on the combined image.

2. The apparatus of claim 1, wherein the simulated infrared illumination range indicates how the reflection of the infrared data interacts with exposure features of an onboard camera of the unmanned aerial vehicle.

3. The apparatus of claim 1, wherein, to perform the range-based darkening, the processor is configured to execute the instructions to:
   applying a darkening filter to one or more portions of the second copy of the input image data to darken RGB values within the one or more portions.

4. The apparatus of claim 3, wherein the one or more portions are determined based on an expected range of infrared illumination.

5. The apparatus of claim 1, wherein the processor is further configured to execute the instructions to:
   introduce camera noise within the combined image prior to using the combined image for training the learning model.

6. The apparatus of claim 5, wherein the combined image including the camera noise represents image data that an onboard camera of an unmanned aerial vehicle is configured to capture while the unmanned aerial vehicle is in a night mode configuration.

7. The apparatus of claim 1, wherein the input image data includes one or more images captured using an infrared filter of an onboard camera of an unmanned aerial vehicle.

8. The apparatus of claim 7, wherein the trained learning model is used by the unmanned aerial vehicle while the unmanned aerial vehicle is a night mode configuration.

9. A method, comprising:
producing a first image based on a simulated infrared illumination range determined within an environment depicted by a first copy of input image data by simulating a reflection of infrared data from an infrared light onboard an unmanned aerial vehicle;
producing a second image based on a range-based darkening performed against a second copy of the input image data;
producing a combined image by blending the first image and the second image;
training a learning model based on the combined image; and
providing the trained learning model for use by one or more unmanned aerial vehicles while the one or more unmanned aerial vehicles navigate in a night mode configuration.

10. The method of claim 9, wherein the
one or more unmanned aerial vehicles include the unmanned aerial vehicle from which the infrared data is obtained.

11. The method of claim 9, wherein producing the second image comprises:
darkening RGB values within the second copy of the input image data using a darkening filter.

12. The method of claim 9, comprising:
prior to using the combined image for training the learning model, introducing camera noise into the combined image to cause the combined image to represent image data that one or more cameras of the one or more unmanned aerial vehicles are configured to capture.

13. The method of claim 9, comprising:
transmitting, based on changes at a server at which the learning model is trained, an update to the learning model to the one or more unmanned aerial vehicles.

14. The method of claim 9, wherein the combined image includes infrared data of the first image and darkened RGB color data of the second image.

15. The method of claim 9, wherein the input image data includes one or more images captured by a camera of the unmanned aerial vehicle and processed to remove infrared data.

16. A non-transitory computer storage medium storing instructions that, when executed by one or more processors, cause the one or more processors to perform operations comprising:
blending a first image produced based on an infrared reflection mask simulation performed against a first copy of input image data and a second image produced based on a range-based darkening performed against a second copy of the input image data to produce a combined image, wherein performing the infrared reflection mask simulation includes simulating a reflection of infrared data to determine a simulated infrared illumination range within an environment depicted by the first copy of input image data;
training a learning model using the combined image; and
providing the trained learning model for use by an unmanned aerial vehicle while the unmanned aerial vehicle navigates while in a night mode configuration.

17. The non-transitory computer storage medium of claim 16, the operations comprising:
performing the range-based darkening by applying a darkening filter to one or more portions of the second copy of the input image data to darken RGB values within the one or more portions.

18. The non-transitory computer storage medium of claim 16, the operations comprising:
preparing the combined image for use in training the learning model by augmenting the combined image with camera noise.

19. The non-transitory computer storage medium of claim 16, wherein the combined image includes infrared data of the first image and darkened RGB color data of the second image.

20. The non-transitory computer storage medium of claim 16, wherein the infrared data is from an infrared light onboard the unmanned aerial vehicle.

* * * * *